United States Patent [19]

Webb

[11] Patent Number: 4,822,321
[45] Date of Patent: Apr. 18, 1989

[54] COMBINATION WATER PUMP AND BELT TENSIONER

[75] Inventor: Donald L. Webb, Romeo, Mich.

[73] Assignee: General Motors Corporation, Detroit, Mich.

[21] Appl. No.: 220,286

[22] Filed: Jul. 18, 1988

[51] Int. Cl.[4] .................................. F16H 7/14
[52] U.S. Cl. .......................... 474/117; 474/135
[58] Field of Search ............ 474/112, 117, 118, 133, 474/135, 110, 101, 113; 123/41.44, 198 C; 418/270

[56] References Cited

U.S. PATENT DOCUMENTS

| | | | |
|---|---|---|---|
| 2,894,051 | 7/1959 | Gassmann | 474/117 X |
| 2,953,241 | 9/1960 | Lehman | 474/113 X |
| 3,110,190 | 11/1963 | Belting et al. | 474/117 |
| 4,283,182 | 8/1981 | Kraft | 474/110 |
| 4,583,961 | 4/1986 | Kawasawa et al. | 474/113 |

Primary Examiner—Stephen J. Novosad
Attorney, Agent, or Firm—Patrick M. Griffin

[57] ABSTRACT

A combined water pump and belt tensioner includes an arm pivoted to the outside of the water pump housing so as to swing about the axis of the pump shaft. Loads on the arm are transmitted to the pump housing, but not to the pump shaft. A pulley on the arm both tensions the belt and powers the pump shaft through a small drive belt that compensates for the swinging of the arm.

3 Claims, 3 Drawing Sheets

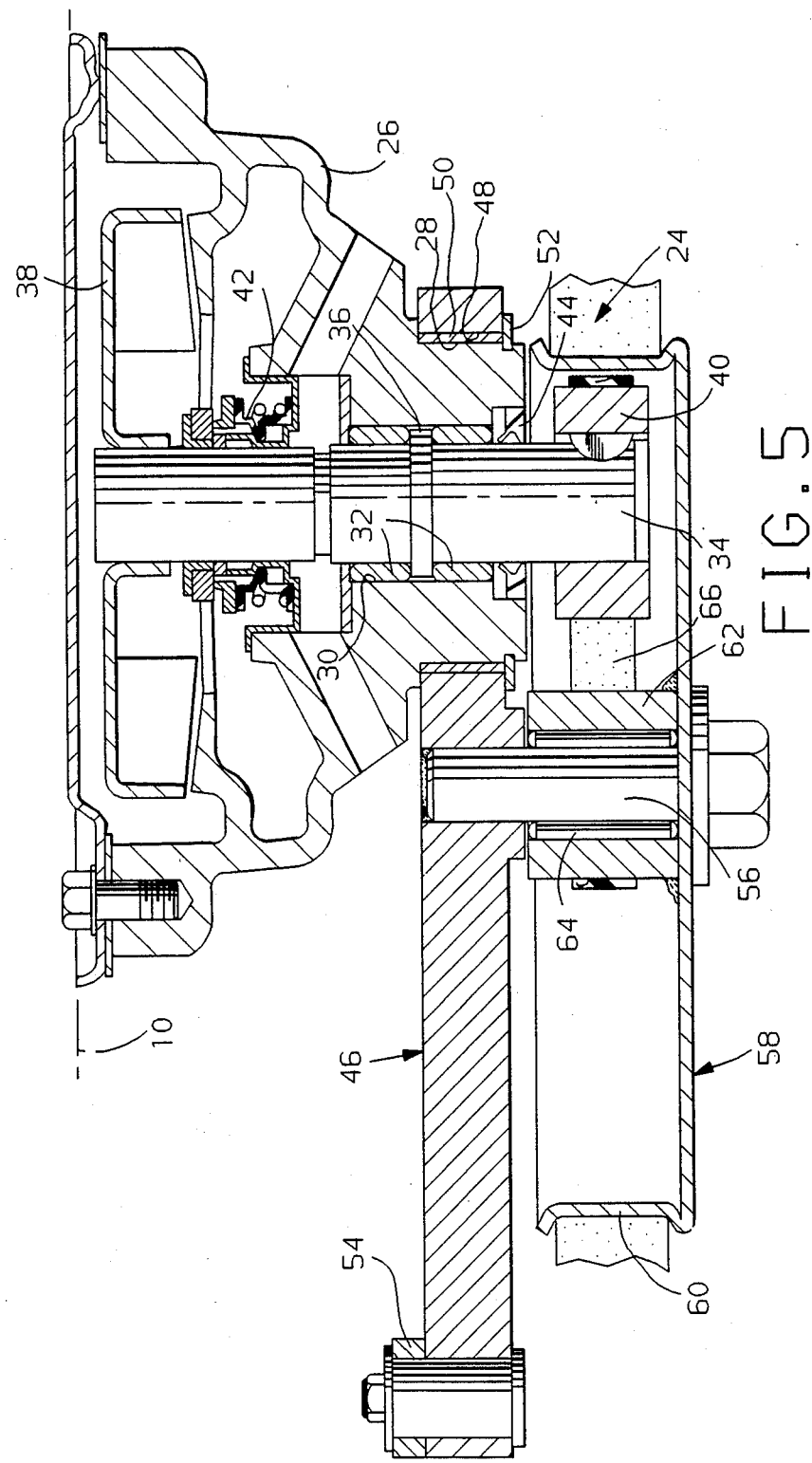

4,822,321

COMBINATION WATER PUMP AND BELT TENSIONER

BACKGROUND OF THE INVENTION

This invention relates to water pumps and belt tensioners in general, and specifically to a combined water pump and belt tensioner.

Vehicle engine coolant pumps, generally referred to as water pumps, have a housing secured to the engine block and a pump shaft rotatably supported by a ball or roller bearing within the pump housing. An impeller is fixed to the inner end of the pump shaft, while the outer end extends out of the housing and and has a pulley fixed thereto. A crankshaft driven belt, generally referred to as a fan belt, drives the pump shaft pulley and the pump shaft pulley drives the pump shaft. The belt loads seen by the water pump shaft bearing are large, and generally require a heavy and expensive bearing.

The fan belt is often a long, serpentine belt that powers many other vehicle mounted accessories in addition to the water pump. Consequently, it is highly subject to length change, especially stretch, and some sort of tensioner is needed to maintain proper tension in the fan belt as its length changes so as to maintain proper frictional contact between the belt and the various pulleys that it wraps. The tensioner is typically a structure separate from the accessories, consisting of a swinging arm with a tensioner pulley that is spring loaded into a run of the belt. Tensioners are generally heavy and expensive, as well as somewhat bulky.

SUMMARY OF THE INVENTION

The invention reduces cost, weight and space used through a combined water pump and tensioner that drives the water pump, keeps the fan belt under tension, and isolates the pump shaft from the fan belt loads so that it may use a much lighter bearing. In the preferred embodiment disclosed, the pump housing has its own bearing portion, specifically a cylindrical journal surface integrally formed on the outside of the housing. The pump shaft is rotatably supported within the housing, coaxial to the journal surface, but a relatively light and inexpensive bearing is used. The inner end of the pump shaft mounts an impeller, while the outer end mounts a relatively small diameter driven pulley.

An arm has a bore through one end that fits closely over the pump housing journal surface in order to swing about the journal surface-pump shaft coaxis. Any forces tending to disturb or twist the arm will be seen by the journal surface and housing, but will be isolated from the pump shaft and its bearing. A tension means, such as a spring or spring-damper unit, is connected between the other end of the arm and the vehicle engine block or body so as to apply a continual force tending to swing the arm in a selected direction. A drive pulley with an outer rim and a coaxial hub spaced from the rim is rotatably supported through the hub to the arm at an axis between the arm ends, but closer to the journal surface-pump shaft coaxis. The drive pulley is also substantially coplanar to the driven pulley, so that its rim surrounds the driven pulley, giving a compact unit. A flexible drive means, specifically a small drive belt, wraps both the drive pulley hub and the driven pulley so that the drive pulley and the driven pulley turn one to one.

As the fan belt runs, the drive pulley rim is forced into a run of the fan belt to keep it under continual tension, and is spun by the fan belt about an axis parallel to the journal surface-pump shaft coaxis. The drive pulley's axis is not fixed relative to the vehicle, but swings in an arc about the fixed coaxis as the arm swings. The location of the tensioner pulley is optimal in that it is coincident with the water pump drive pulley. As the drive pulley spins, its hub concurrently drives the driven pulley and pump shaft, through the smaller drive belt. The pump shaft bearing is isolated from the fan belt loads on the drive pulley and arm, however, as these will be transferred to the housing journal surface and to the pump housing. As the fan belt stretches and the drive pulley axis swings about the coaxis of the pump shaft and pump housing journal surface, the small drive belt compensates by rolling around the two axes, maintaining the driving connection between the drive pulley hub and driven pulley without interfering with the swinging of the arm.

It is, therefore, a general object of the invention to power a water pump from the fan belt, yet isolate the pump shaft and bearing from the fan belt loads.

It is another object of the invention to place the fan belt tensioner at an optimal location.

It is another object of the invention to reduce parts, weight, expense and and space used by combining the water pump and belt tensioner.

It is yet another object of the invention to achieve the above with a combined water pump and tensioner in which a swingable tensioner arm uses a portion of the pump housing as its bearing, so that belt loads are isolated from the pump shaft, and in which the same pulley that tensions the belt also drives the pump shaft through a flexible drive means that maintains the driving connection between the tensioner-drive pulley and the pump shaft as the arm swings.

DESCRIPTION OF THE PREFERRED EMBODIMENT

These and other objects and features of the invention will appear from the following written description, and from the drawings, in which:

FIG. 5 is a cross sectional view of the invention taken along the line 5—5 of FIG. 3.

Figure 1:
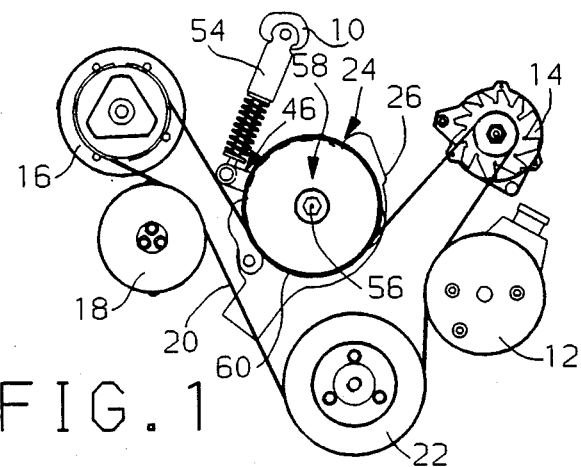
FIG. 1 is a partially schematic view showing the location of several vehicle accessories, including the combined water pump and tensioner of the invention.

Referring first to FIG. 1, a vehicle includes an engine block 10 to which are mounted several belt driven accessories. These may include a power steering pump 12, generator 14, air conditioning compressor 16, and air pump 18. They are powered by a serpentine fan belt 20 which is run by the crankshaft pulley 22. Belt 20, given its length and the demands placed upon it by the multiple accessories, is subject to significant length change, especially stretch. Tension is maintained in the belt 20, and coolant pumping also provided by, the combined water pump and tensioner of the invention, a preferred embodiment of which is designated generally at 24.

Figure 2:
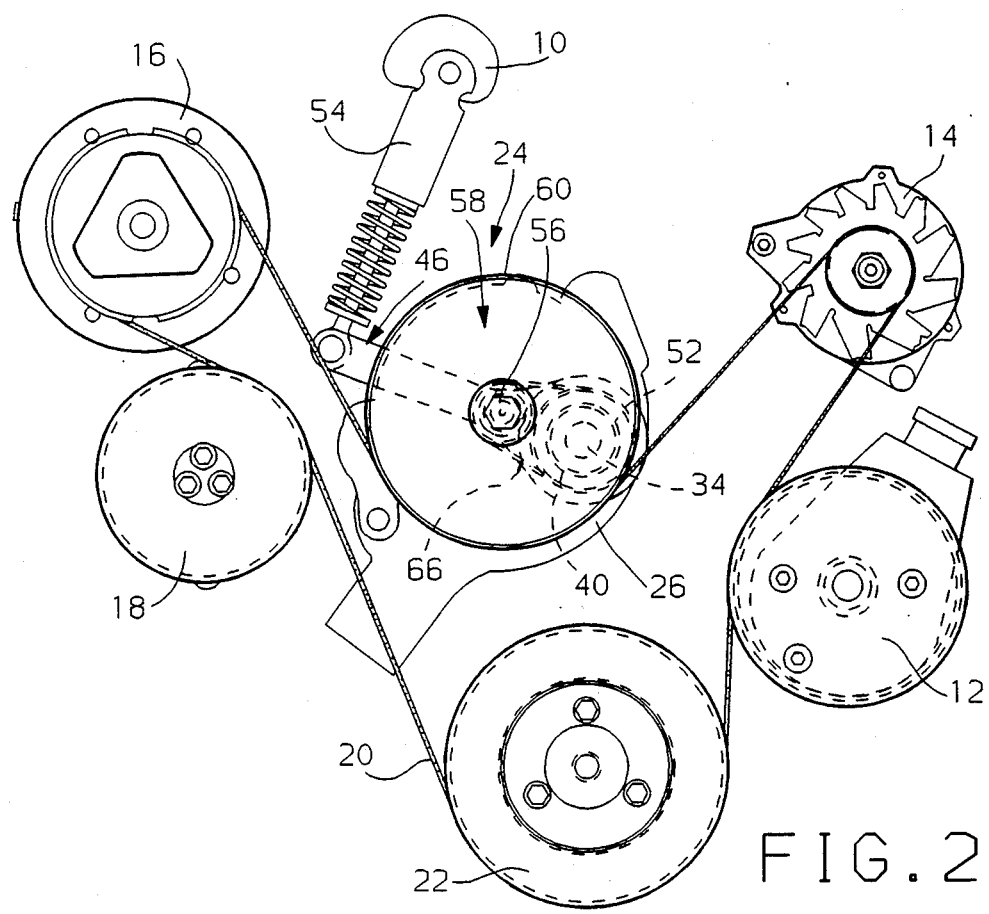
FIG. 2 is an enlargement of FIG. 1 showing the location of more parts in dotted lines.
Figure 4:
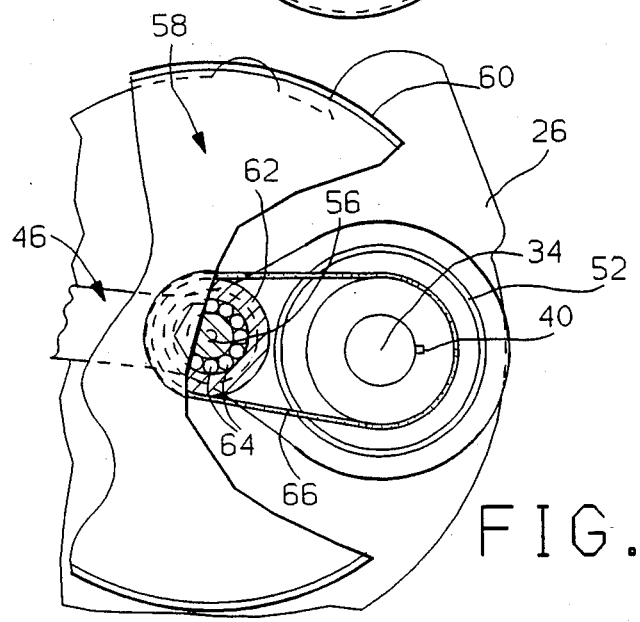
FIG. 4 is an enlarged portion of FIG. 3 with the drive pulley partially broken away.

Referring next to FIGS. 2, 4 and 5 the invention 24 includes a metal pump housing 26 that is bolted securely to block 10. Housing 26 has a cylindrical journal surface 28 machined on the outside thereof. A bore 30 coaxial to journal surface 28 has a pair of plain bearing sleeves or bushings 32 rigidly fixed therein. A pump shaft 34 fits closely inside bushings 32 and has a shoulder 36 trapped between their inner facing edges. Pump shaft 34 is thus rotatably supported and axially located by bushings 32 with its inner end inside housing 26 and its outer end extending outside of housing 26. It will be immediately recognized by those skilled in the art that bushings 32 are much simpler and less costly than a typical water pump bearing. The inner end of pump shaft 34 has an impeller 38 fixed thereto, while the outer end has a small diameter driven pulley 40 fixed thereto. A conventional water pump seal 42 seals the inner end of shaft 34 against coolant loss, and a press in dirt seal 44 protects the outer end against dirt entry.

Still referring to FIGS. 2, 4 and 5, a metal arm designated generally at 46 has a bore 48 through one end that generally matches the diameter of pump housing journal surface 28. Here, bore 48 is a little larger than journal surface 28 to allow a bearing sleeve 50 to be added to journal surface 28 for friction reduction. Arm bore 48 fits closely over bearing sleeve 50, held on by a snap ring 52. Arm 46 is thereby supported so as to swing on housing 26 about the coaxis of the journal surface 28 and pump shaft 34. Because of the way arm 46 is supported, any loads on it will be seen by journal surface 28 and pump housing 26, but not by pump shaft 34 or its light bushings 32. A suitable tension means, in this case a spring and damper unit 54, is connected between the other end of arm 46 and engine block 10 to apply a continual force tending to swing arm 46 counterclockwise about the coaxis of journal surface 28 and pump shaft 34. A stub shaft 56 is fixed to arm 46 at a point between the two ends of arm 46, close to and parallel to bore 48. A drive pulley, designated generally at 58, has an outer rim 60 that surrounds a coaxial inner hub 62. The outer surfaces of rim 60 and hub 62 are suitably adapted to make frictional contact with a belt. Drive pulley 58 is rotatably supported on stub shaft 56 with a needle bearing 64 and so spins about an axis parallel to the axis of shaft 34. Drive pulley 58 is essentially coplanar to the smaller driven pulley 40 so that rim 60 surrounds and shields both driven pulley 40 and hub 62. Finally, a small drive belt 66 wraps both drive pulley hub 62 and driven pulley 40 so that they will turn one to one. The surrounding rim 60 helps to protect drive belt 66 from splash.

Figure 3:
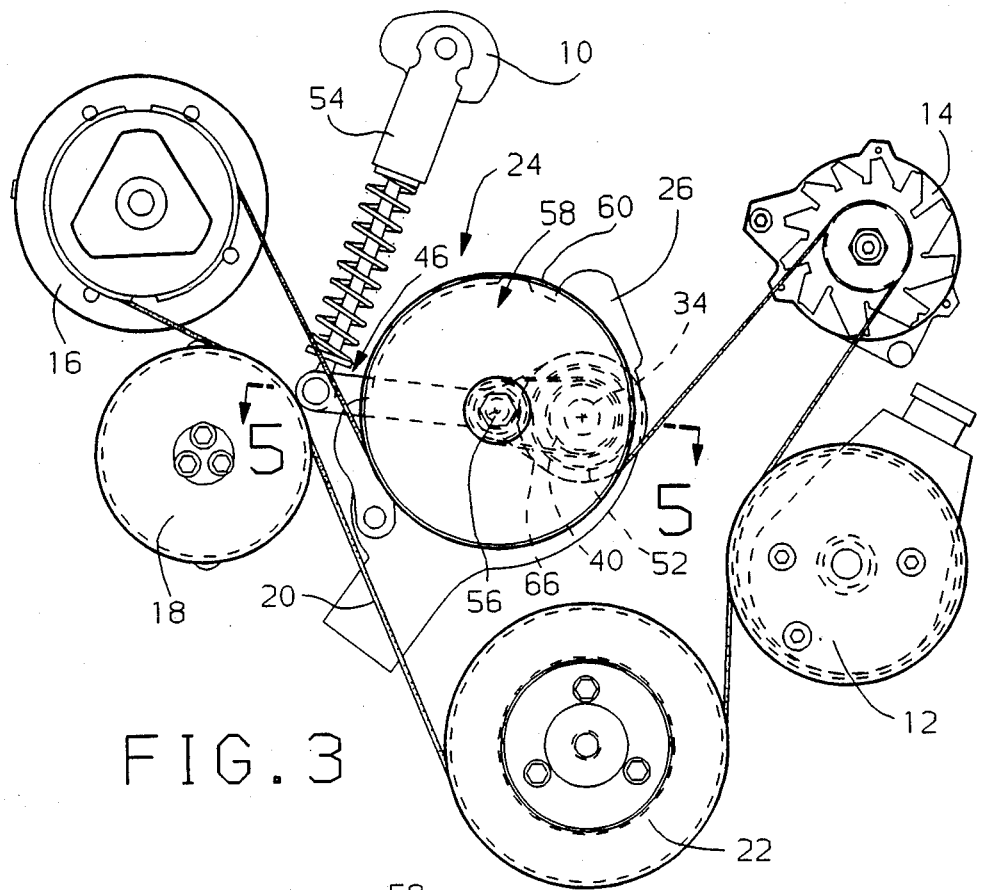
FIG. 3 is a view like FIG. 2, but showing the tensioner arm shifted with a change in belt length.

Referring next to FIGS. 2 and 3, drive pulley rim 60 is continually pushed by spring-damper unit 54 into a run of fan belt 20, maintaining it under a continual tension. As fan belt 20 stretches or contracts, pulley 58 stays with it, moving between the FIGS. 2 and 3 positions, or coming to equilibrium at any position therebetween. The axis of pulley 58 therefore swings in a circular arc, as shown by the arrows. Thus, the axis of drive pulley 58 maintains a constant radial or center to center distance from the pump housing journal surface 28-pump shaft 34 coaxis, although their relative angular position changes. Since pulley 58 is in continual forced contact with fan belt 20, it is spun thereby, and concurrently drives the smaller pulley 40 through the cooperation of hub 54 and drive belt 66 to drive pump shaft 34 and impeller 38. Pulley 58 therefore serves as a pump drive pulley as well as a tensioner pulley. Drive belt 66 does not transmit an significant amount of the fan belt load from arm 46 and pulley 58 to shaft 34, however, so shaft 34 and bushings 32 are almost totally load isolated and protected. A conventional tensioner pulley would be remote from the water pump, whereas here they are coincidental. This is an optimal position for a tensioner pulley, and allows the tensioning force of unit 54 to act much more efficiently and directly, and thus be of smaller magnitude than it would have to be in a more remote tensioner location. As the axis of drive pulley 58 axis swings in its arc from the FIG. 2 to the FIG. 3 position, the drive belt 66 rolls or shifts around, compensating for the change in relative angular location between hub 62 and driven pulley 40. Since the center to center distance between the hub 54 and pulley 40 does not change, however, the drive belt 66 is not stretched or stressed. There is sufficient clearance between driven pulley 40 and rim 60 to prevent interference with the swinging of arm 46.

Variations of the preferred embodiment 24 may be made. The bearing on pump housing 26 could be a structure other than the cylindrical surface 28, even a rolling bearing of some kind, since that would still serve to take the loads from arm 46 to the pump housing 26 and isolate the pump shaft 34 and its bearings. A plain bearing like journal surface 28 and sleeve 50 is simple and economical, however, as it may be integrally formed with pump housing 26. A flexible drive means other than drive belt 66 could be used to maintain the driving connection between drive pulley 58 and driven pulley 40 as the drive pulley hub 54 swings. Possible alternatives include a chain or even a suitable gear set. The drive belt 66 is particularly simple and effective, however, and can be easily located within the rim 60 when both hub 54 and driven pulley 40 are surrounded by rim 60. Therefore, it will be understood that it is not intended to limit the invention to just the preferred embodiment disclosed.

The embodiments of the invention in which an exclusive property or privilege is claimed are defined as follows:

1. A combination vehicle engine coolant pump and engine fan belt tensioner, comprising, a pump housing having a bearing portion on the outside thereof, a pump shaft rotatably supported inside said pump housing coaxial to said pump housing bearing portion with an impeller mounted to the inner end of said pump shaft and with the outer end of said pump shaft extending out of said housing, a driven pulley on said pump shaft outer end, an arm attached at one end to said housing bearing portion so as to swing about the coaxis of said housing bearing portion and pump shaft, tension means connected to bias said arm to swing in one direction, a drive pulley rotatably supported on said arm at a location intermediate its two ends so as to spin about an axis that is parallel to said pump housing bearing portion-pump shaft coaxis and which swings about said coaxis as said arm swings, said drive pulley having an outer surface adapted to engage a run of said fan belt so as to keep said fan belt under continual tension as said arm swings and so as to be spun by said fan belt, said drive pulley also having an inner surface coaxial to said outer surface that spins therewith, and, a flexible drive means operatively connected between said drive pulley inner surface and said driven pulley so that said drive pulley and driven pulley turn one to one, whereby, said pump shaft will be driven by said fan belt, with the fan belt loads on said drive pulley and arm being transferred to said pump housing bearing portion and pump housing, thereby isolating said pump shaft from said fan belt loads while said flexible drive means compensates for said drive pulley and driven pulley axes swinging relative to one another as said arm swings with a change in fan belt length.

2. A combination vehicle engine coolant pump and engine fan belt tensioner, comprising, a pump housing having a cylindrical journal surface formed on the outside thereof, a pump shaft rotatably supported within said housing coaxial to said journal surface with an impeller mounted to one end of said pump shaft and with the other end of said pump shaft extending out of said housing, a driven pulley on said other pump shaft end, an arm journaled at one end to said housing journal surface so as to swing about the coaxis of said journal surface and pump shaft, tension means connected to the other end of said arm so as to swing said arm in one direction, a drive pulley rotatably supported on said arm at a location intermediate its two ends so as to spin about an axis parallel to said journal surface-pump shaft coaxis, said drive pulley having an outer cylindrical surface adapted to engage a run of said fan belt so as to keep said fan belt under continual tension and so as to be spun by said fan belt, said drive pulley also having an inner surface coaxial with the outer surface that spins therewith, and, a pump drive belt wrapping said drive pulley inner surface and said driven pulley so that said drive pulley and said driven pulley turn one to one, whereby, said pump shaft will be driven by said fan belt, with the fan belt loads on said drive pulley and arm being transferred to said housing journal surface and housing, thereby isolating said pump shaft from said fan belt loads, while said drive belt compensates for said drive pulley and driven pulley axes swinging relative to one another as said arms swings with a change in fan belt length.

3. A compact, combination vehicle engine coolant pump and engine fan belt tensioner, comprising, a pump housing having a cylindrical journal surface formed on the outside thereof, a pump shaft rotatably supported within said housing coaxial to said journal surface with an impeller mounted to one end of said pump shaft and with the other end of said pump shaft extending out of said housing, a driven pulley on said other pump shaft end, an arm journaled at one end to said housing journal surface so as to swing about the coaxis of said journal surface and pump shaft, tension means connected to the other end of said arm so as to swing said arm in one direction, a drive pulley rotatably supported on said arm at a location intermediate its two ends and substantially coplanar to said driven pulley so as to spin about an axis parallel to said journal surface-pump shaft coaxis, said drive pulley having an outer rim adapted to engage a run of said fan belt so as to keep said fan belt under continual tension and so as to be spun by said fan belt, said drive pulley rim also surrounding said said driven pulley with a predetermined clearance, said drive pulley also having an inner hub coaxial with said rim that spins therewith, and, a pump drive belt wrapping said drive pulley hub and said driven pulley so that said drive pulley and said driven pulley turn one to one, whereby, said pump shaft will be driven by said fan belt, with the fan belt loads on said drive pulley and arm being transferred to said housing journal surface and housing, thereby isolating said pump shaft from said fan belt loads, while said drive belt compensates for said drive pulley hub swinging relative said driven pulley as said arm swings with a change in fan belt length, said predetermined clearance being sufficient to prevent contact between said rim and driven pulley as said arm swings.

* * * * *